(12) United States Patent
Hartmann

(10) Patent No.: US 7,597,362 B2
(45) Date of Patent: Oct. 6, 2009

(54) PLUG-IN CONNECTOR FOR TUBE AND HOSE LINES WITH CATCH SPRING GUIDE

(75) Inventor: Harald Hartmann, Dornbirn (AT)

(73) Assignee: Henn GmbH & Co. KG, Dornbirn (AT)

( * ) Notice: Subject to any disclaimer, the term of this patent is extended or adjusted under 35 U.S.C. 154(b) by 0 days.

(21) Appl. No.: 10/575,141

(22) PCT Filed: Feb. 24, 2004

(86) PCT No.: PCT/EP2004/001821

§ 371 (c)(1),
(2), (4) Date: Jul. 2, 2008

(87) PCT Pub. No.: WO2005/045299

PCT Pub. Date: May 19, 2005

(65) Prior Publication Data

US 2008/0252070 A1    Oct. 16, 2008

(30) Foreign Application Priority Data

Aug. 15, 2003 (DE) ............................... 103 38 123
Oct. 8, 2003 (DE) ............................... 103 46 712

(51) Int. Cl.
*F16L 37/088* (2006.01)
(52) U.S. Cl. ........................................ 285/321; 285/307
(58) Field of Classification Search ................. 285/321, 285/305, 307

See application file for complete search history.

(56) References Cited

U.S. PATENT DOCUMENTS

| 2,084,431 | A | * | 6/1937 | Catley ........................ 285/314 |
| 3,177,018 | A | * | 4/1965 | Goodwin ..................... 285/277 |
| 3,538,940 | A | * | 11/1970 | Graham ...................... 137/271 |
| 3,560,027 | A | * | 2/1971 | Graham ...................... 137/271 |
| 4,526,411 | A | * | 7/1985 | Bartholomew .............. 285/305 |
| 4,699,403 | A | | 10/1987 | Wong |
| 5,000,614 | A | * | 3/1991 | Walker et al. ................ 403/326 |
| 5,273,323 | A | * | 12/1993 | Calmettes et al. ........... 285/321 |
| 5,431,454 | A | * | 7/1995 | Calmettes et al. ............ 285/3 |

(Continued)

FOREIGN PATENT DOCUMENTS

CH            448 644        12/1967

(Continued)

*Primary Examiner*—James M Hewitt
(74) *Attorney, Agent, or Firm*—Norris McLaughlin & Marcus, PA; Christa Hildebrand, Esq.

(57) ABSTRACT

A plug-in connector for tube and hose lines includes a nozzle with a catch shoulder extending around at least a part of the outer circumference. The catch shoulder is formed by an inclined surface with a slope that increases from the outer circumference and a catch surface following in the insertion direction. A plug may be latched to the catch surface of the nozzle by at least two spaced-apart latching locations and supports a radially-displaceable, essentially U-shaped catch spring having two lateral legs formed as catch legs. Both latching locations of the catch spring can latch reliably and simultaneously, even if the nozzle is inserted into the plug at an angle, by forming the catch spring with at least one additional approximately centered latching location disposed between the plug and the nozzle. The additional latching location is located forward of the two lateral latching locations in the insertion direction.

4 Claims, 18 Drawing Sheets

U.S. PATENT DOCUMENTS

| | | | |
|---|---|---|---|
| 5,536,047 A * | 7/1996 | Detable et al. | 285/39 |
| 5,855,399 A * | 1/1999 | Profunser | 285/305 |
| 5,857,718 A * | 1/1999 | Kleinschmidt | 285/305 |
| 5,988,705 A | 11/1999 | Norkey | |
| 6,371,528 B1 * | 4/2002 | Kimura | 285/305 |
| 6,681,458 B2 * | 1/2004 | Seymour | 24/675 |
| 6,983,958 B2 * | 1/2006 | Rautureau | 285/305 |
| 6,997,486 B2 * | 2/2006 | Milhas | 285/305 |
| 7,201,403 B2 * | 4/2007 | Takayanagi et al. | 285/321 |
| 7,338,092 B1 * | 3/2008 | Cicconi, III | 285/305 |
| 7,387,318 B2 * | 6/2008 | Yoshida | 285/321 |
| 7,393,019 B2 * | 7/2008 | Taga et al. | 285/321 |
| 7,438,328 B2 * | 10/2008 | Mori et al. | 285/305 |

FOREIGN PATENT DOCUMENTS

| | | |
|---|---|---|
| DE | 29514585 U1 | 12/1995 |
| EP | 0750152 B1 | 12/1996 |

\* cited by examiner

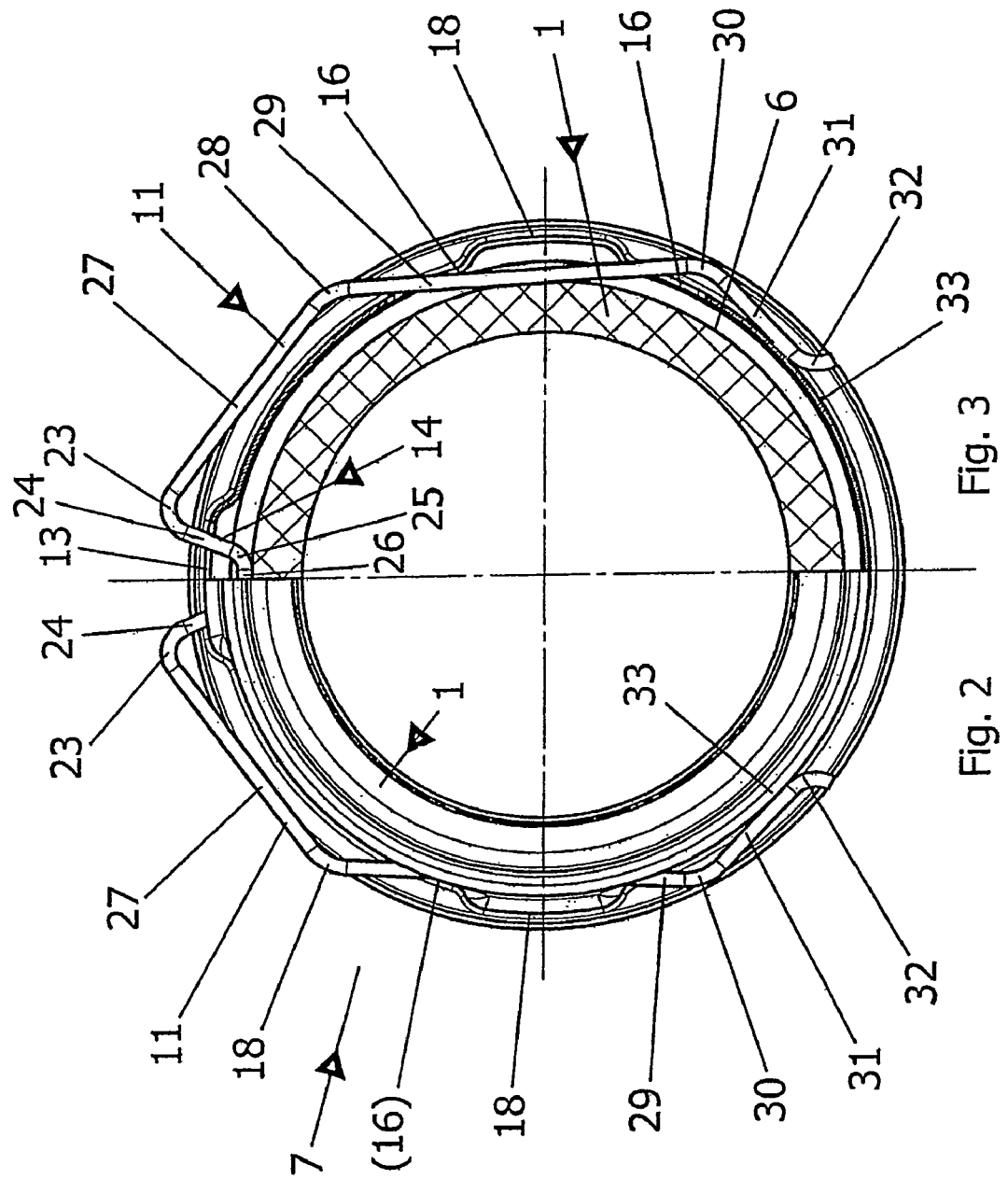

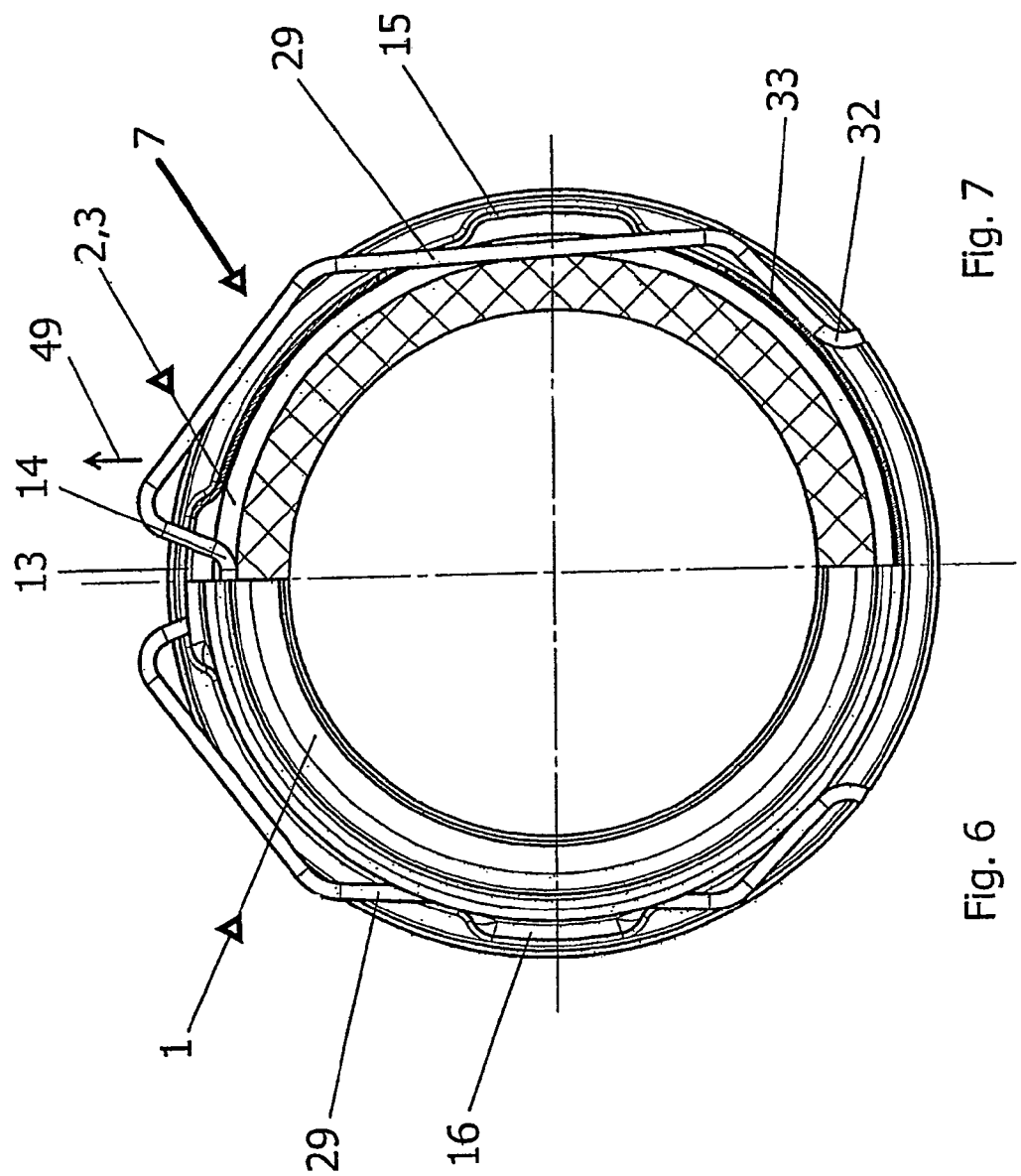

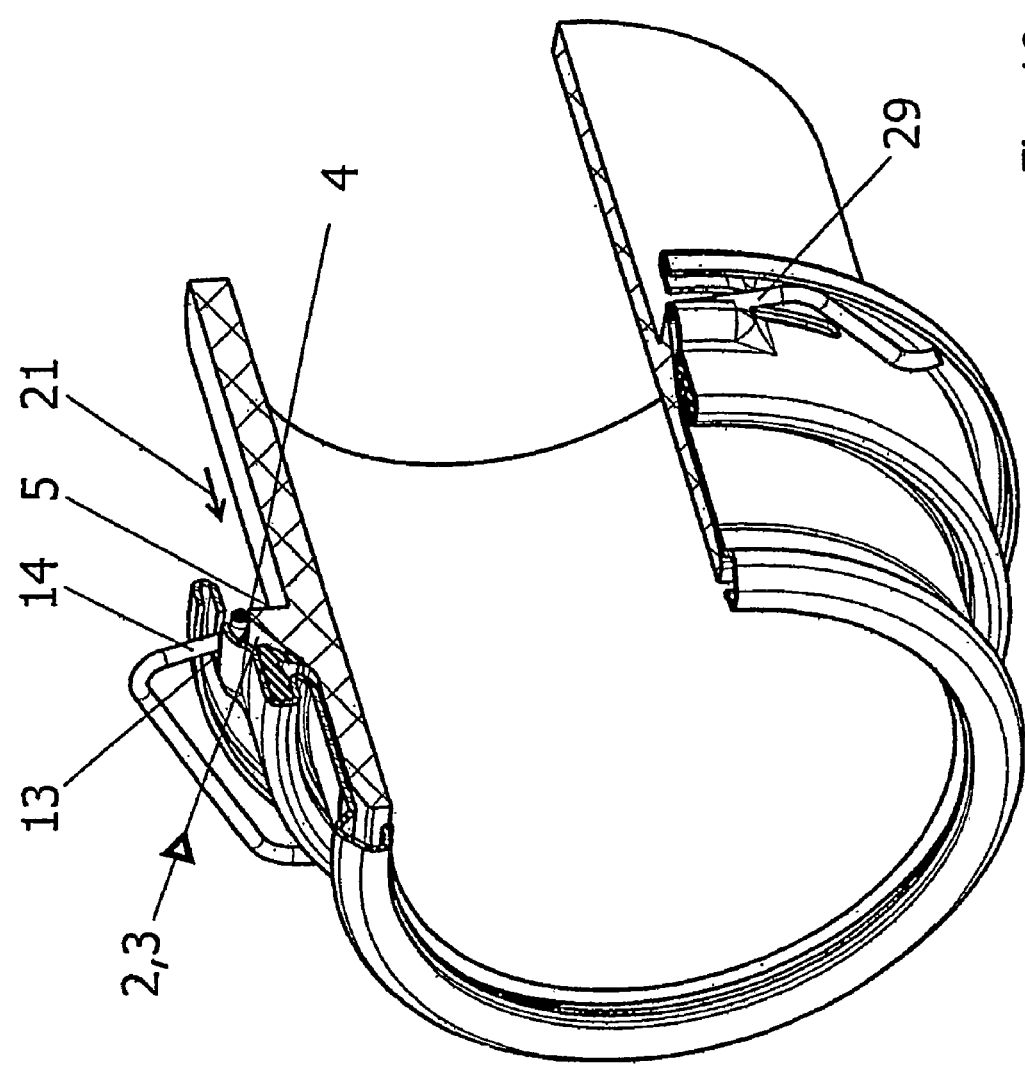

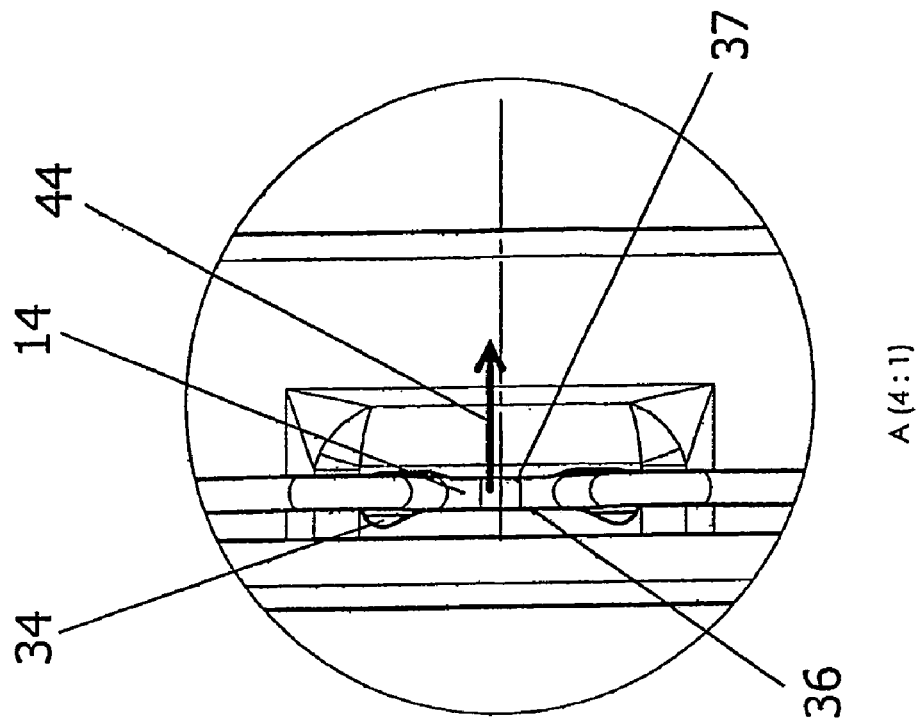
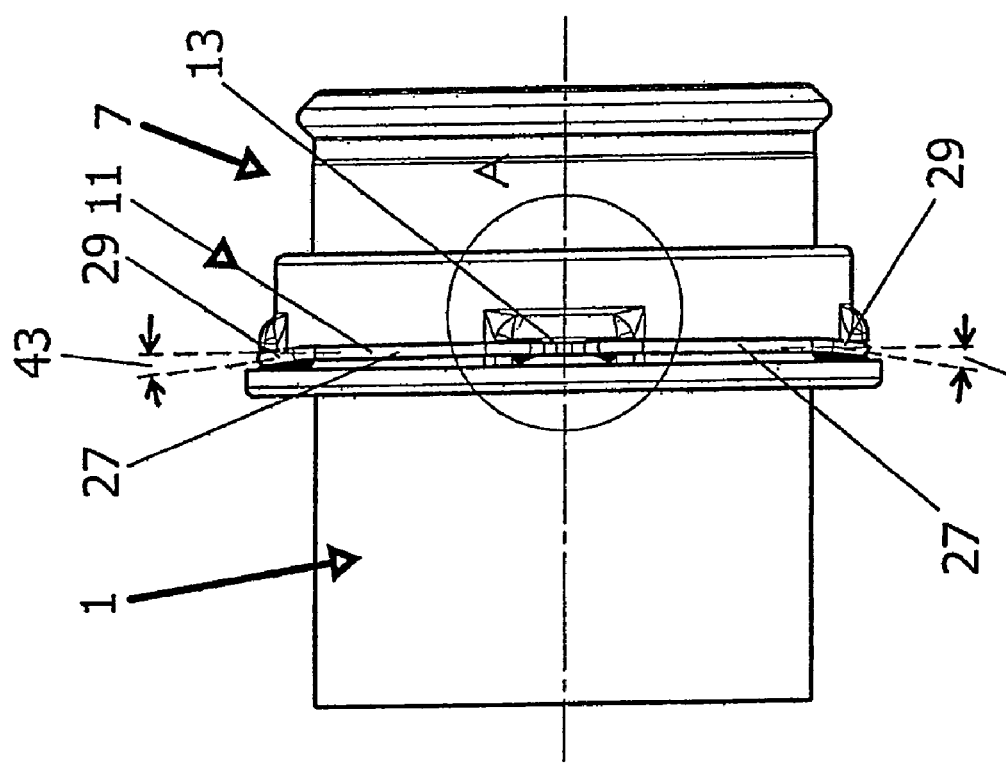

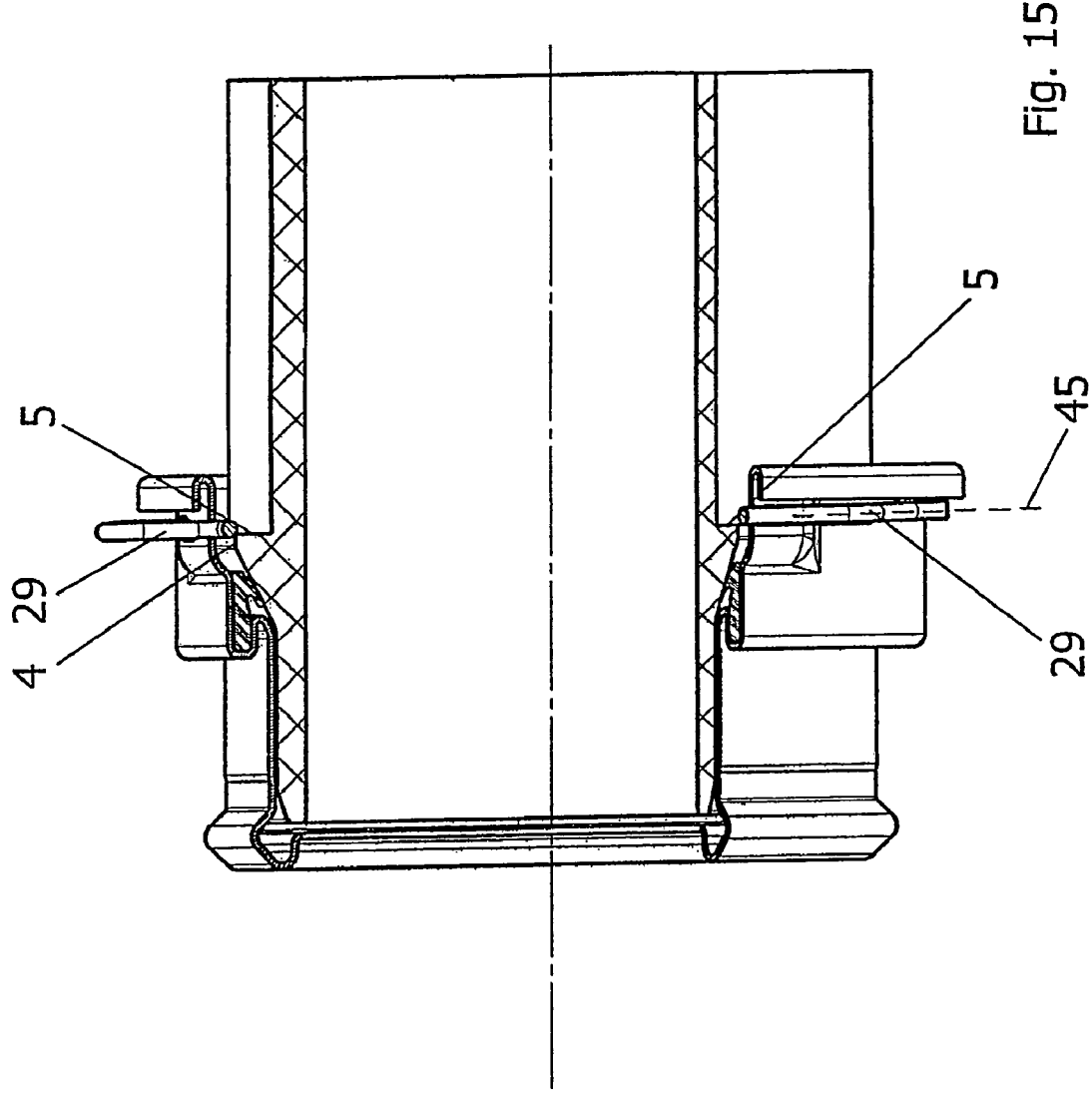

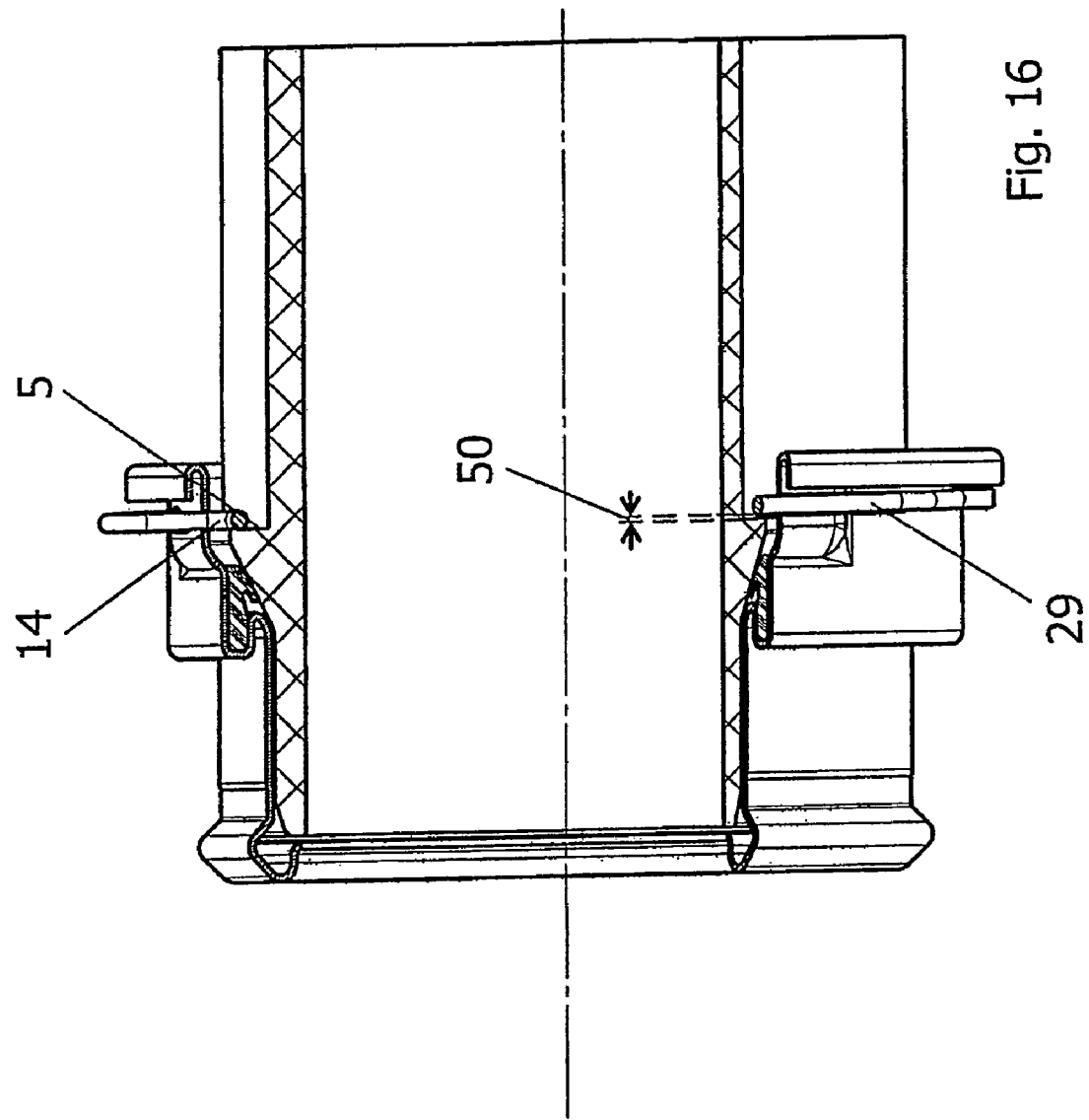

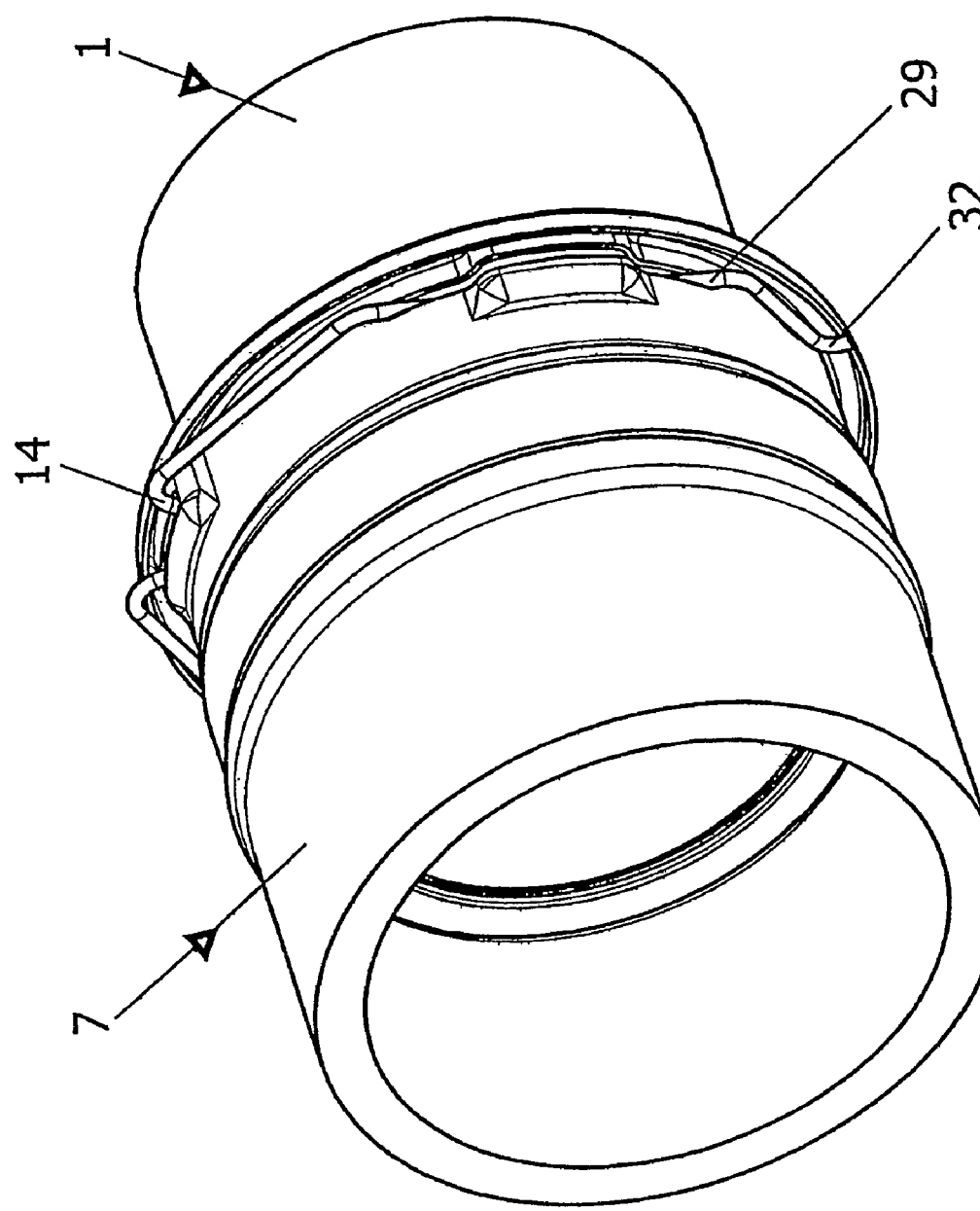

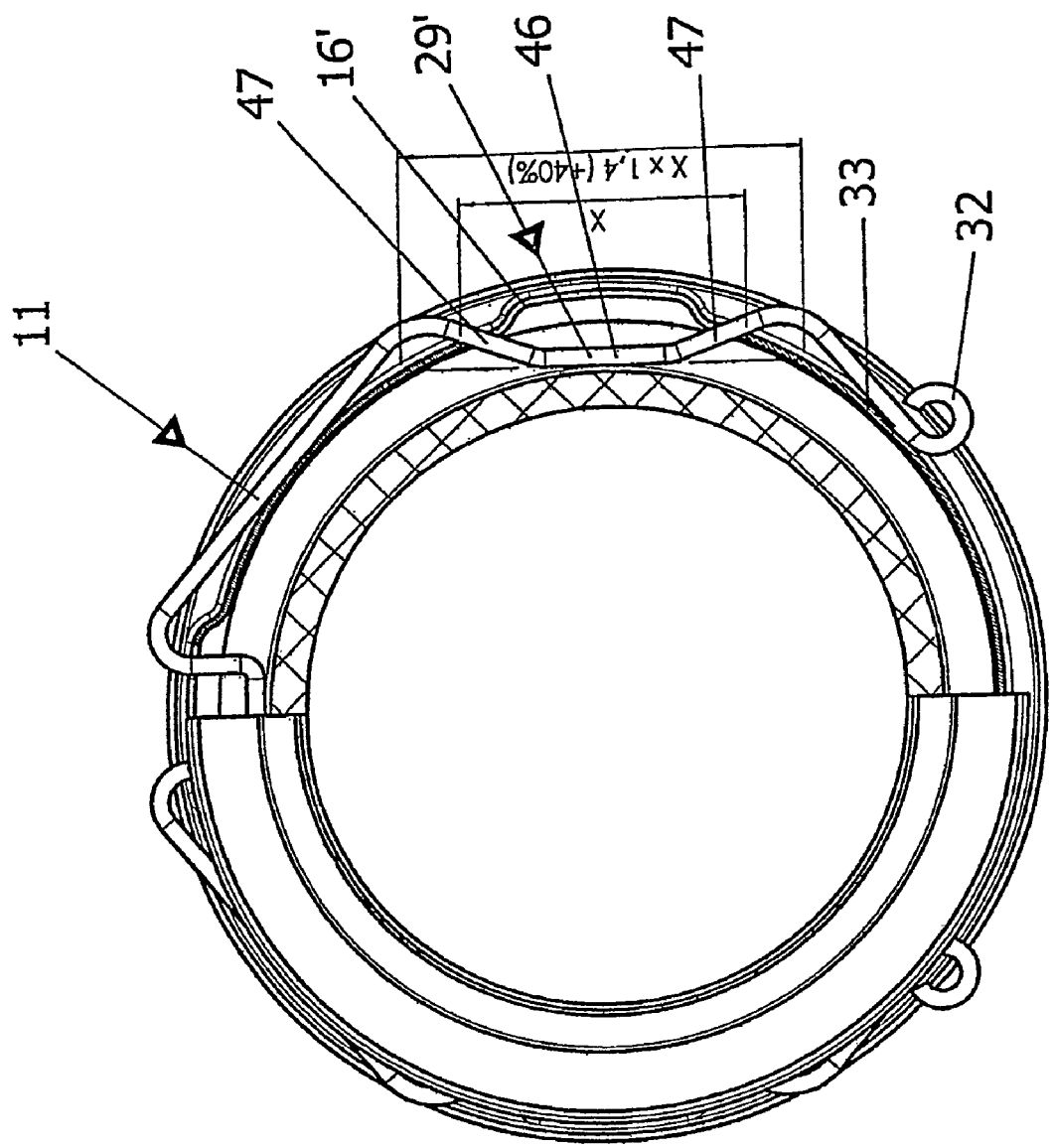

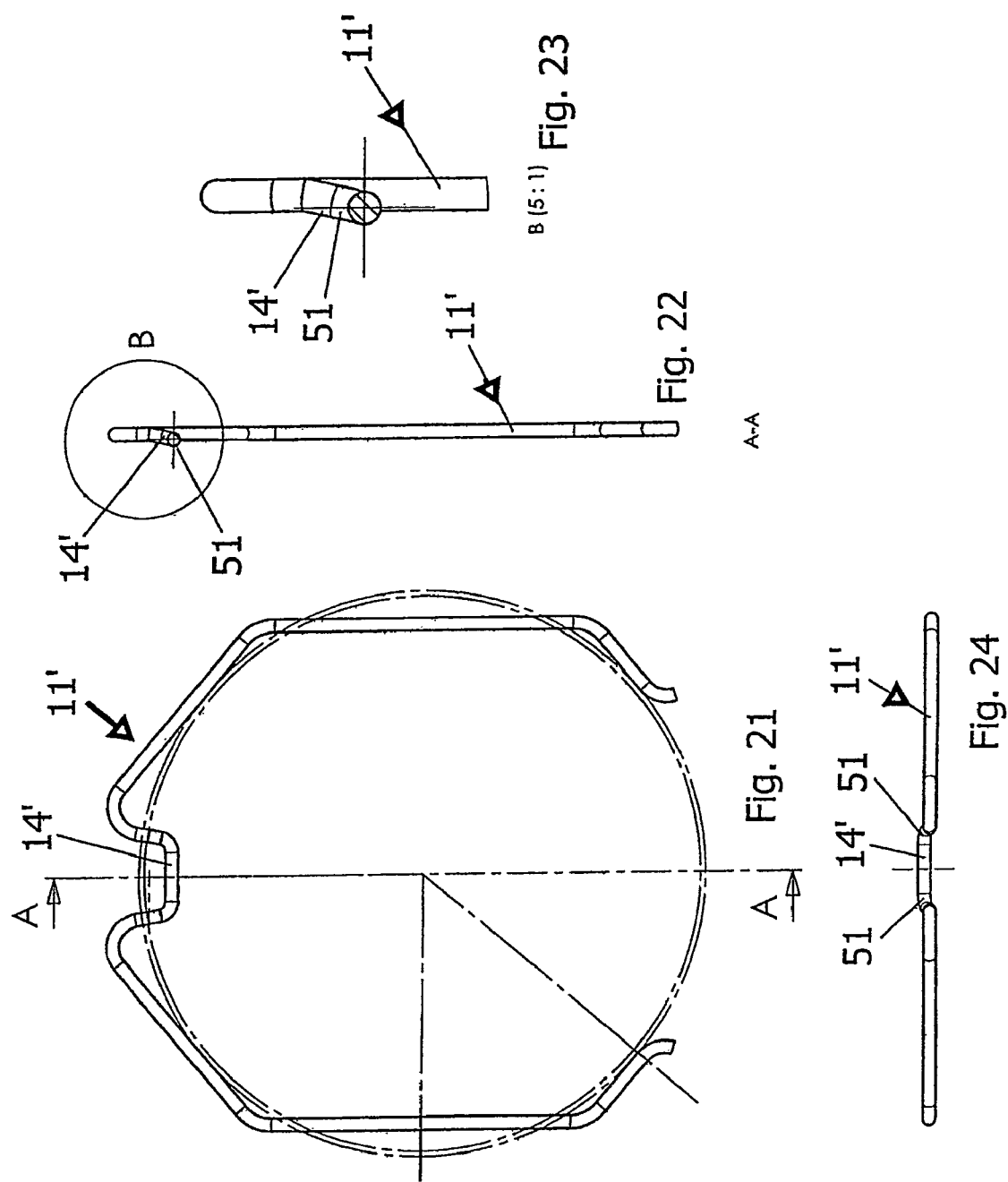

PLUG-IN CONNECTOR FOR TUBE AND HOSE LINES WITH CATCH SPRING GUIDE

The invention relates to a plug-in connector for tube and hose lines with a catch spring guide having a nozzle with a catch shoulder extending at least partially around the outer circumference. The catch shoulder formed of an inclined surface sloping upward from the outer circumference and a catch surface following in the plug-in direction, and a plug that can latch with the nozzle on the catch surface of the nozzle by way of at least two spaced-apart snap-in locations, with the plug supporting a radially displaceable, approximately U-shaped catch spring haying two lateral legs formed as catch legs.

For example, EP 0 750 152 B1 of the same applicant discloses a plug-in connector for tube and hose lines. Reference is made to the description in that document, the content of which is incorporated herein in its entirety.

The plug-in connector of EP 0 750 152 runs the risk that the plug-in connection latches only on one side. The catch spring is made of an approximately U-shaped clamp having a center base leg, with two lateral catch legs extending from the center base leg, terminating at two opposing free spring ends.

The two lateral legs operate as catch legs for establishing the snap-in connection between a nozzle and a plug. In this way, two lateral spaced apart snap-in locations are formed.

When the nozzle is inserted into the insertion opening of the plug, an inclined surface engages on the nozzle underneath the catch legs of the catch spring and lifts the catch spring. If the nozzle is canted during insertion into the insertion opening of the plug, then one of the catch legs may already have moved across the inclined surface of the nozzle and latched, while the other opposing leg has not, or only partially, latched.

The snap-in connection may appear to the user as being completely closed, whereas in reality the functionality of the snap-in connection is severely limited because it has latched on only one side.

It is therefore an object of the invention to improve a plug-in connection for tube and hose lines of the aforedescribed type so that when the snap-in connection is established, the two opposing catch legs of the catch spring reach the catch surface on the catch shoulder of the nozzle simultaneously.

One-sided latching should be prevented even if the nozzle is inserted to one side and canted.

The object of the invention is solved by the technical teachings of claim 1.

According to an essential feature of the invention, at least one additional snap-in location is formed approximately in the center, in addition to the two lateral snap-in locations.

The two snap-in locations of the snap-in connection are formed in a manner known in the art by the two opposing catch legs of the catch spring. According to the invention, at least a third snap-in location is provided by way of a novel shape of the catch spring. The catch spring has an approximately centrally located control clip, which is arranged in the region of the base leg of the catch spring.

The term "a" third snap-in location by way of "a" control clip of the catch spring should not be understood as a limitation of the invention. A single third snap-in location located approximately in the center is described only to simplify the description. More than a total of three snap-in locations may be provided. In particular, instead of a single additional snap-in location in the center, several such snap-in locations may be provided.

An entirely novel effect is achieved by arranging (at least) three snap-in locations on the catch spring cooperating with the catch shoulder on the nozzle:

During insertion of a nozzle provided with a catch shoulder into the novel plug, all three snap-in locations initially engage with the inclined surface on the catch shoulder of the nozzle.

The inclined surface on the catch shoulder ensures that the opposing catch legs of the catch spring are lifted out of their respective catch spring openings.

It is important that a control clip is arranged on the catch spring in the region of the center snap-in location, with the control clip extending radially inward through the plug section and likewise cooperating with the inclined surface on the catch shoulder of the nozzle. The control clip is the element which forms the catch spring guide and ensures that the two lateral catch legs always latch behind the inclined surface of the catch shoulder synchronously and concurrently.

This is achieved by the invention in that when the nozzle is inserted into the plug, the inclined surface on the catch shoulder first lifts the center control clip and thereby displaces the catch spring radially outwardly. The spring ends of the catch spring are hereby displaced along the wall of the plug in the circumferential direction, and the catch spring with all the snap-in locations is placed in an unlatched and opened state.

According to the invention, the center snap-in location implemented by the control clip is the last element to establish the snap-in connection when the nozzle is inserted into the plug. The center snap-in location holds the snap-in connection open, while the plug is inserted farther into the nozzle, until the two lateral catch legs have moved safely and by a considerable distance past the catch surface of the nozzle so as to safely latch behind the catch surface during insertion.

Stated it differently, the catch spring is held in the raised and open position until the inclined surface of the nozzle has moved past the center snap-in location, which is formed by the center control clip, and the center control clip has latched behind the inclined surface.

According to the invention, the center snap-in location is offset in the insertion direction (to the rear in the axial direction) between the control clip of the catch spring and the inclined surface on the catch shoulder of the nozzle, so that the control clip latches first on the catch surface of the catch shoulder, while the two catch legs on the catch spring cannot yet latch. The clip spring is moved into a lowered position only after the control clip has latched on the catch surface of the catch shoulder, at which time the catch legs of the clip spring also reach the region of the catch surface on the catch shoulder and latch synchronously and concurrently.

It is therefore central to the invention that a third catch surface is formed in the center region of the catch spring, that this snap-in location is established first, and that the two other snap-in locations in the region of the catch legs can synchronously latch only after this snap-in location has been established.

If the nozzle is inserted into the insertion opening of the plug at an angle, then the clip in the center region of the catch spring always remains in the raised position. The catch legs of the catch spring are then held open and are prevented from latching on one side behind the catch surface on their catch shoulder of the nozzle.

By offsetting the center snap-in location relative to the other two snap-in locations on the respective catch legs of the catch spring in the insertion direction, the control clip (also referred to as the center control lug) latches first, thereby bringing the spring into a lowered snap-in location. Only then do the two opposing to catch legs snap in the catch surface on the catch shoulder of the nozzle during further insertion of the nozzle into the plug-in connection.

The center control clip in a way "primes" the two lateral snap-in locations only after they have moved behind the respective catch surface on the nozzle with a large enough axial spacing. With this approach, impediments are eliminated which would prevent these two snap-in locations from latching simultaneously, for example, when the components are canted during insertion.

By lifting the control clip in the center region of the catch spring, the catch spring is always held open until the control clip reaches its snap-in location and latches behind the catch surface of the catch shoulder. Only then can the two other catch legs of the catch spring reach their snap-in location and also latch.

Since the control clip is offset to the front in the insertion direction, the nozzle must first be inserted into the plug with the greatest possible insertion depth, so that the center snap-in location engages, before the axially rearward snap-in location can engage with the catch surface of the catch shoulder.

In this way, the center snap-in location (which controls the catch spring) engages first, before the two other snap-in locations in the region of the catch legs synchronously engage with the catch surface of the catch shoulder of the nozzle.

However, the invention is not limited to a single center control clip. Instead of using a single control clip produced by bending the catch spring, the same functionality can also be achieved by other measures.

For example, a lug or shoe may be formed in the center region on the catch spring, which also engages in the interior space of the plug and cooperates with the inclined surface on the catch shoulder of the nozzle, operating like a snap-in location.

It is also not required that only a single center snap-in location be provided.

Instead of a single center snap-in location, two or three center snap-in locations can be provided. The description of a total of three snap-in locations (one center location and two lateral locations) is therefore to be understood only as exemplary and not as a limitation of the invention.

The plug-in connection described herein is also independent of the medium flowing through the plug-in connection. This type of plug-in connection can therefore be used for any hose or tube connection, independent of the medium passing through.

The plug can also be formed, for example, as a single piece on a connecting tube or component (e.g., a cooler). The entire plug can be fabricated, for example, of a plastic material, as can the nozzle which latches with the plug.

This type of plug-in connection is used for producing fluid-tight and gas-tight connections of tube and hose lines.

The axial offset of the control clip in the insertion direction is provided by a control slit disposed on the plug, hereinafter also referred to as "negative lug."

The following functional features are implemented:

The center slit for the "negative lug" is offset in the axial direction or has a special contour, so that it must be pushed over. The same can also be achieved with an offset spring.

The catch spring is displaced radially outwardly by the negative lug and slides into the locked position only when securely latched. This can be visually indicated by a color marking on the catch spring (color marking so that it disappears behind the flange of the plug section, when locked).

Rotation Lock.

Held captive by hooking into elastic clip or by "hooks" and elastic spring (offset slits) or reset flange via the spring.

As a result of the bent leg in the region of the slit, the spring contacts the slit but does not latch, even if the nozzle were already inserted. The same effect can be achieved by changing the boundary angle.

Two-dimensional spring (in a plane) is possible, through "safety hook" (=negative lug) and a special slit.

The catch spring ends cannot be unintentionally opened/lifted, because the spring ends are covered (flange, additional element, . . . ) and the opening motion takes place along the circumference.

Advantages:

No one-sided latching

No additional element

Captively held

Rotation lock against asymmetric latching

Rotation lock optimizes, minimizes installation force

Optimizes installation force through radial displacement, because the lever action is maximized Less interlocking, simpler manufacture, reduced risk of injury, improved magazining through two-dimensional flexible element.

Potential material savings, when the inwardly bent legs hold the spring open, then the boundary angle can be eliminated.

Snap-in locations possible through webs on the plug section.

Optimized slit lengths/stability of the plug.

Functional Features of the Catch Spring:

Inwardly bent leg, shortened slit length possible

Asymmetric design also possible (only on one side). This would make it easier to maintain the spring dimensions of the nozzle.

Advantage for Plug Manufacture:

Smaller slit length on the plug for the opening of the catch spring legs, thereby less weakening of the cross-section.

The subject matter of the invention is not limited to the features recited in the individual claims, but also includes features from a combination of the individual claims.

All information and features disclosed in the documents, including in the abstract, in particular the three-dimensional arrangements shown in the drawings, are to be considered an essential part of the invention, as far are they are novel, either alone or in combination.

Exemplary embodiments of the invention will now be described with reference to the drawings. The drawings and their description include additional features and advantages of the invention.

IT IS SHOWN IN

FIG. 1 a quarter section perspective view of a plug-in connection according to the invention in the released state;

FIG. 2 a front view of one half of the diagram of FIG. 1;

FIG. 3 a half section through the diagram of FIG. 1;

FIG. 4 a side view of the plug-in connection of FIG. 1;

FIG. 5 a quarter section of the plug-in connection to FIG. 1 when the snap-in connection is in its initial state;

FIG. 6 a half front view of the diagram of FIG. 5;

FIG. 7 a half section through the diagram of FIG. 5;

FIG. 8 a side view of a plug-in connection of FIG. 5 in the same insertion state;

FIG. 9 an enlarged view of the center section of the catch spring and the plug-in connection according to FIG. 8;

FIG. 10 a quarter section of the snap-in connection in an advanced state compared to FIG. 5;

FIG. 11 a front view of one half of the diagram of FIG. 10;

FIG. 12 a partial half section view through the diagram of FIG. 10;

FIG. 13 a side view of the plug-in connection of FIG. 10 in the inserted state;

FIG. 14 an enlarged view of the center section of the plug-in connection of FIG. 13;

FIG. 15 a quarter section through the plug-in connection in a more advanced state shortly before reaching the final snap-in location;

FIG. 16 an advanced state of the plug-in connection compared to FIG. 15 in a partially locked state;

FIG. 17 a perspective side view of the plug-in connection in a fully locked state;

FIG. 18 a quarter section through the diagram of FIG. 17 in the fully locked state;

FIG. 19 a front view of the diagram of FIG. 18;

FIG. 20 an embodiment of a catch spring modified from FIGS. 1 to 19 with a bent catch leg;

FIG. 21 an embodiment of a catch spring modified from FIGS. 1 to 19 with a bent control leg;

FIG. 22 a side view of FIG. 21;

FIG. 23 an enlarged side view of FIG. 22;

FIG. 24 a top view of FIG. 21;

FIG. 25 a perspective side view of the snap-in connection in an open state with a protective edge on the plug section; and FIG. 26 the same diagram as FIG. 25 in a locked state.

The exemplary embodiment depicted in FIGS. 1 to 19 describes a nozzle 1, which can be made of a plastic material or a metal. The nozzle 1 includes a cylindrical section implemented as a full cylinder, which has on its outer circumference a catch shoulder 2 with a greater diameter. The catch shoulder is formed in the insertion direction by an inclined surface 3 which transitions with increasing diameter into a cylindrical surface 4, which is followed by the catch surface 5.

The technical teachings of the invention can be implemented without the requirement that the inclined surface 3 and the following catch surface 5 extend around the entire circumference. The inclined surface 3 and the catch surface 5 may only extend along portions of the circumference of nozzle 1.

However, an arrangement with the inclined surface 3 and the following catch surface 5 extending completely around the circumference has the advantage that the plug-in connection is independent of the relative angular orientation between plug and nozzle.

The nozzle 1 is inserted into plug 7 in the direction of arrow 21, whereby the front face 19 of nozzle 1 contacts a corresponding radially inwardly oriented angular ring 20 of plug 7 after the plug-in connection is established (latched).

The nozzle 1 forms in the insertion direction a front guide cylinder 6 which engages underneath the plug 7. The sealing ring 12 disposed on plug 7 seals in the region of the inclined surface 3.

Alternatively, the sealing ring 12 can also sealingly contact the nozzle 1 in the region of the guide cylinder 6.

Of course, several sequentially arranged sealing rings can also be used.

In the exemplary embodiment, the plug 7 is made of a metal part having a rear cylindrical fitting onto which a hose is pushed, with the hose secured by a clamp 9.

Instead of employing different materials for connecting a hose 8 with the plug 7, in a different embodiment the hose 8 can be formed of the same material as and in one piece with the plug 7. In this case, the hose 8 may be fabricated of an extruded plastic material and connected with the plug 7 which is also made of a plastic material.

The plug 7 includes essentially a plug section 10 and a catch spring 11 with a substantially U-shaped profile and a center base leg, from which two catch legs 29 extend laterally and in substantially mutual parallel alignment.

The center base leg of the catch spring 11 is implemented as a novel control clip 14, as will be described in more detail below.

FIG. 1 shows the control clip 14 in a cross-sectional view. Only the lower horizontal part is visible which protrudes radially inward through an associated control slit 13 in the plug section 10.

FIG. 1 also shows that the catch legs 29 extend through corresponding catch spring openings 15, 16 in the plug section and hence protrude into the interior space of plug 7 to cooperate with the inclined surface 3 and the following catch surface 5 of nozzle 1.

The catch spring openings 15, 16 are bounded by corresponding guide beads 17, 18.

FIGS. 2 and 3 show additional details of the catch spring 11. It should be noted that the center part of the catch spring has a horizontal base leg 26 which is connected to an inclined leg 24 via an upwardly sloping bend 25. The inclined leg 24 transitions via a bend 23 into a spring leg 27, which transitions via a bend 28 into the catch leg 29 providing the latching function.

A corresponding bend 30 is arranged on the free end of the catch leg 29, followed by a bottom leg 31 having a free front end with an upwardly bent spring end 32.

The catch spring 11 is exactly mirror-symmetric to the centerline of FIG. 3, so that only one side needs to be described, because the other side is identical.

The plug section 10 also forms a beaded reinforcing edge 22 which improves the mechanical stability of the plug 7.

FIGS. 2 and 3 show the snap-in connection in an open state, i.e., the center snap-in location formed by the control clip 14, like the catch legs 29, are located in front of the inclined surface 3 of nozzle 1. At this time, the components are not latched.

FIG. 4 shows a top view on the snap-in connection before being plugged together. As can be seen, the center control clip 14 of the catch spring 11 engages in a slot 34 on the plug section 10 of plug 7. The particular shape of the slot will be described below with reference to FIG. 9.

The slot forms a control slit 13 which provides an offset of the control clip 14 in the insertion direction 21 when the plug-in connection is established. In the unplugged state, the control clip 14 is located in the same plane as the following spring legs 27 and 29 of the catch spring 11.

When the plug-in connection is established, the inclined surface 3 on the catch shoulder 2 of nozzle 1 engages with both the control clip 14 and the two catch legs 29. FIG. 5 shows that when the nozzle 1 is inserted into the plug 7, the control clip 14 is lifted radially outward, lifting the entire catch spring 11. The two spring ends 32 are displaced in the direction of arrow 41 along the wall 33 on the outer circumference of plug 7.

The two half sections in FIGS. 6 and 7 depict the same situation as FIG. 5.

As can be seen, the control clip 14 is lifted in the direction of arrow 49, and the catch legs 29 are simultaneously shifted upward in the direction of arrow 41, sliding in the corresponding catch spring openings 15, 16. The catch legs 29 are thereby opened, so that their respective diameter is greater than the diameter of the cylindrical surface 4 on nozzle 1.

This situation is also depicted in FIGS. 8 and 9, with FIG. 9 illustrating the particular shape of the control slit 13, which provides an axial offset of the center snap-in location on the control clip 14 with respect to the two outer snap-in locations on the catch legs 29.

The control slit 13 is implemented essentially as a slot 34 which is, however, narrower at the center. This is indicated by the dotted boundary 35 which indicates the total unobstructed width of slot 34. However, instead of the boundary 35, the slot has center regions with opposing constrictions 36, 37 which have a smaller mutual separation than, for example, the outer regions abutting the slot. The slot has therefore two opposing enlarged eyes 38.

In the lowered unlatched position, the approximately trapezoidal control clip 14 with the two inclined legs 24 is located entirely in the region of the eyes 38 and contacts the left edge of the respective eye 38.

If the control clip 14 moves onto the inclined surface 3 of the catch shoulder 2 and is thus lifted upward in a direction perpendicular to the drawing plane of FIG. 9, then the inclined legs 24 reach the region of the inclined surface 39 at the forward boundary of slot 34, so that the entire control clip 14 is moved rearward (as viewed in the insertion direction) in the direction of arrow 21. The entire center region of the catch spring with the control clip 14 is then moved (entrained) in the direction of arrow 21, whereby the outer regions of the catch spring with the spring legs 27 remain fixed in the axial direction and do not move. The center region of the catch spring is thereby slightly bent in the insertion direction, with the control clip 14 moving rearward in the insertion direction.

The slot 34 is arranged in the region of a guide bead 40 having a greater diameter, so that the control clip 14 remains in engagement with slot 34 in the radial outward direction, even if the cylindrical surface 4 of the nozzle having the largest diameter urges the control clip 14 radially outward.

This situation is illustrated in FIG. 10, showing the greatest possible displacement of the catch spring 11 in the region of the control clip 14.

As also shown, the control clip 14 is offset in the direction of arrow 21 in the axial direction towards the rear (in the insertion direction), without affecting the two catch legs 29 of the catch spring.

This situation is depicted in FIG. 11 in 12 which show that in the raised position of the catch spring 11, the spring ends 32 fully contact the wall 33 of the plug section 10 and that the control clip 14 is guided a long the bead 40 in the displacement direction.

FIGS. 13 and 14 show, in comparison to FIGS. 8 and 9, the complete radial displacement of the catch spring shortly before attaining the latching position.

As can be seen, the control clip 14 has performed a pivot motion in the direction of arrow 44. This is evident from a comparison between FIG. 9 and FIG. 14, showing that the previously existing motion clearance 42 between the constriction 37 and the rear portion of the control clip 14 no longer exists, with the entire control clip 14 performing a pivot motion in the axial direction (in the direction of arrow 44) in the region of control slit 13.

As a result, the inclined legs 24 also disengage from the inclined surfaces 39 on slot 34.

FIG. 15 shows this situation in a cross-sectional view, showing that the catch legs 29 have already moved past the cylindrical surface 4 and would already be able to latch behind the catch surface 5. However, this is not yet possible, because the control clip 14 is still in a radially raised position and contacts the cylindrical surface 4, thereby preventing latching of the catch legs 29.

FIG. 16 shows the latching device in a more advanced insertion state compared to FIG. 15. The two catch legs 29 have here been displaced farther in a radial inward direction on the catch surface 5, but cannot completely latch, because the control clip 14 still contacts the cylinder surface and hence prevents complete latching.

Only after the nozzle 1 is inserted farther into plug 7 does the control clip 14 move across the cylindrical surface 4 into the region of the following catch surface. The outward radial displacement of the control clip 14 is then cancelled, and the control clip 14 is urged radially inwardly by its inherent spring force, allowing the catch legs 19 to latch simultaneously, as seen in FIG. 16. This situation is shown in FIG. 24, wherein the control clip 14 has just moved into its latched position behind the catch surface 5 and the two catch legs 29 (only one of the catch legs 29 is shown in FIG. 16) already have an offset 50 from the catch surface 5. Due to the offset 50, the catch legs 29 can now safely lock behind the catch surface 5, which is only possible when the control clip 14 is also latched behind the catch surface 5.

It therefore becomes clear that the control clip 14 must always reach its latching position first, before the two catch legs 29 move safely behind the catch surface 5 with an axial offset 50. This offset 50 is still present even if the nozzle were inserted at an angle.

FIG. 17 shows the completely latched position between plug and nozzle, and FIG. 18 shows a quarter section through the completely latched position. The aforedescribed offset 50 between the control clip 14 and the catch legs 29 is eliminated because the control clip completely slides into the slot 34 of control slit 13, and the aforementioned components are again in the same plane, as depicted in FIG. 18.

FIG. 20 shows a modified embodiment of the aforedescribed exemplary embodiment. According to a central feature of the modified embodiment, the slit length of the catch spring openings 15, 16 should be kept as short as possible, so that the wall of the plug is only minimally weakened.

Figure 1:
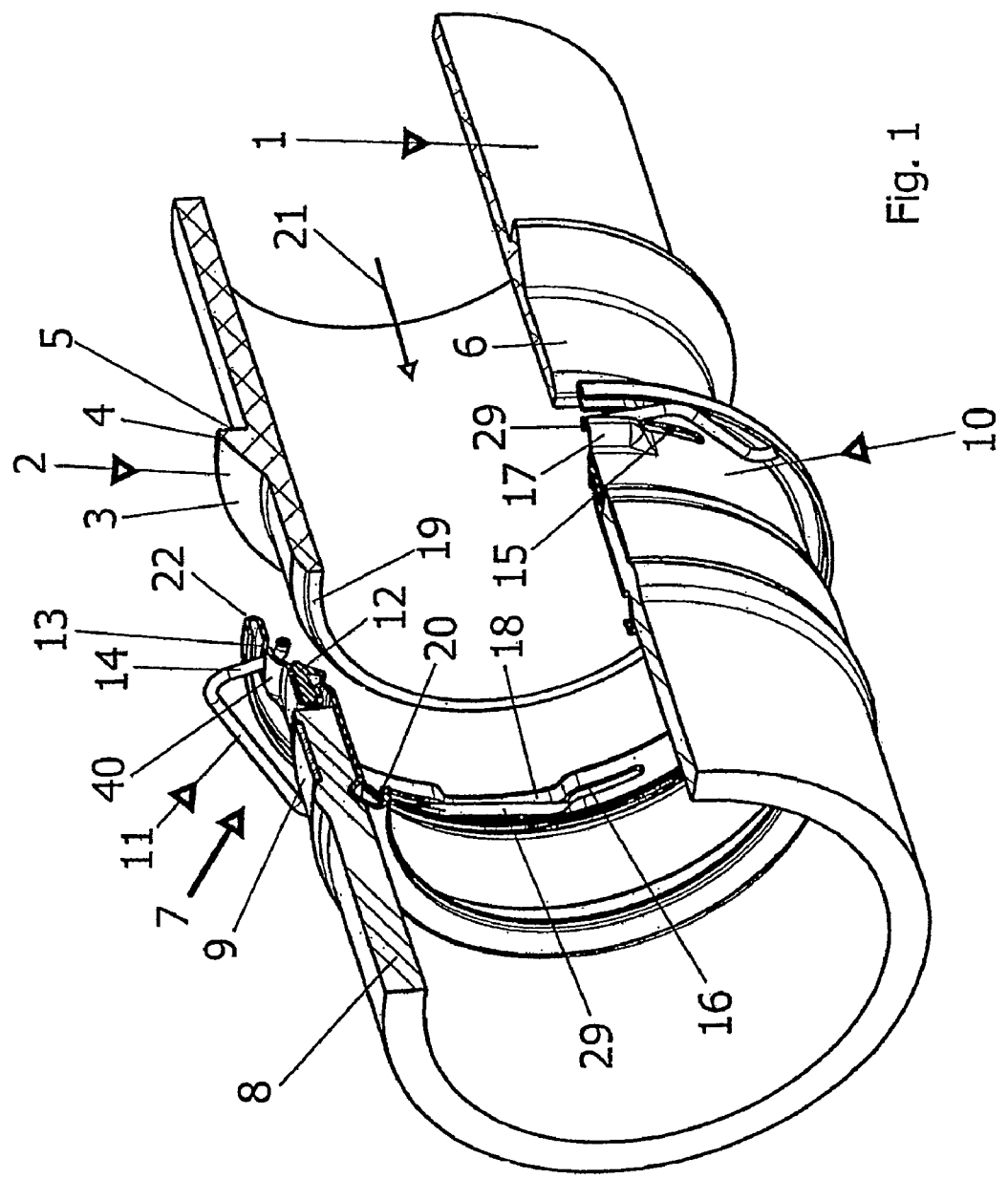
Figure 4:
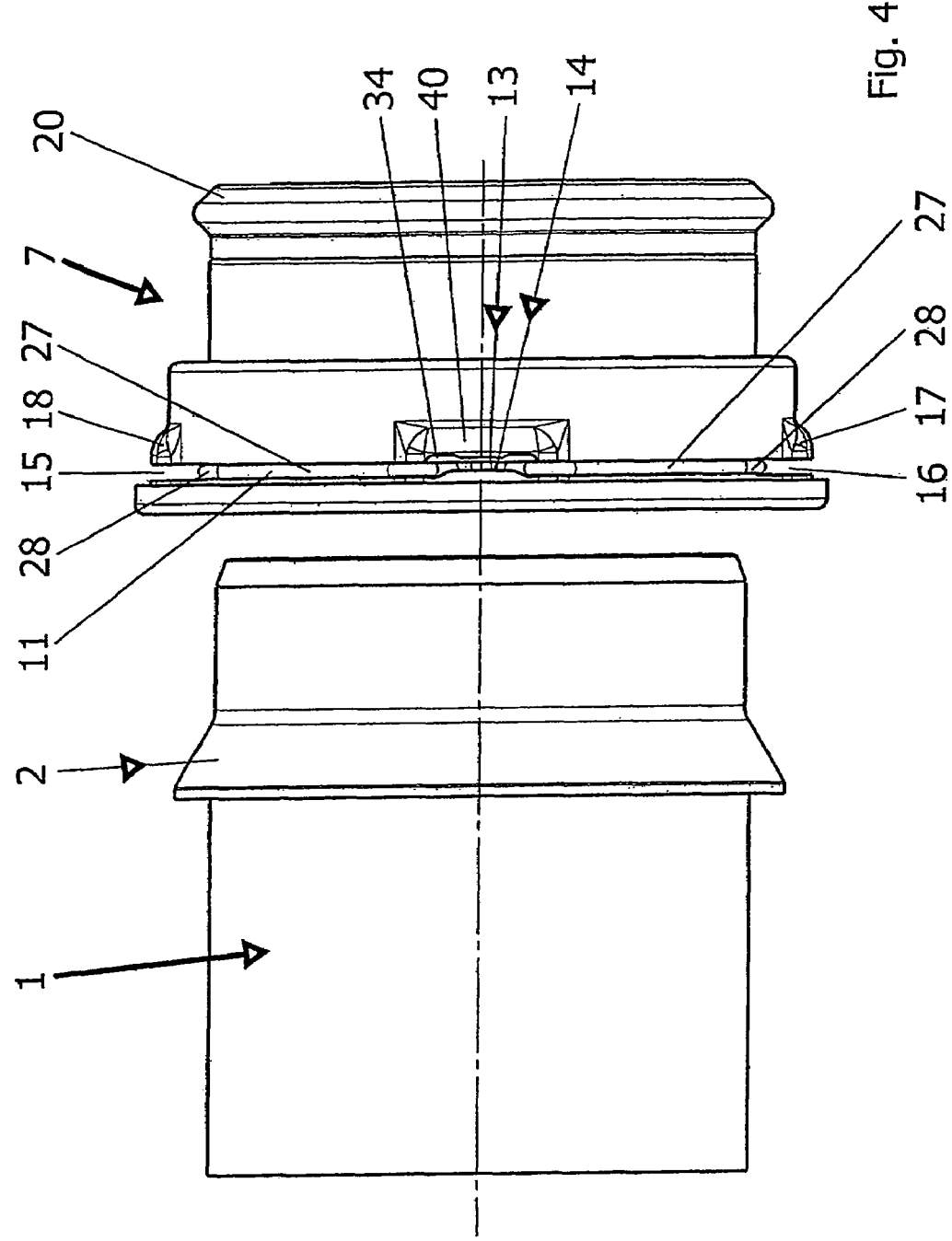
Figure 5:
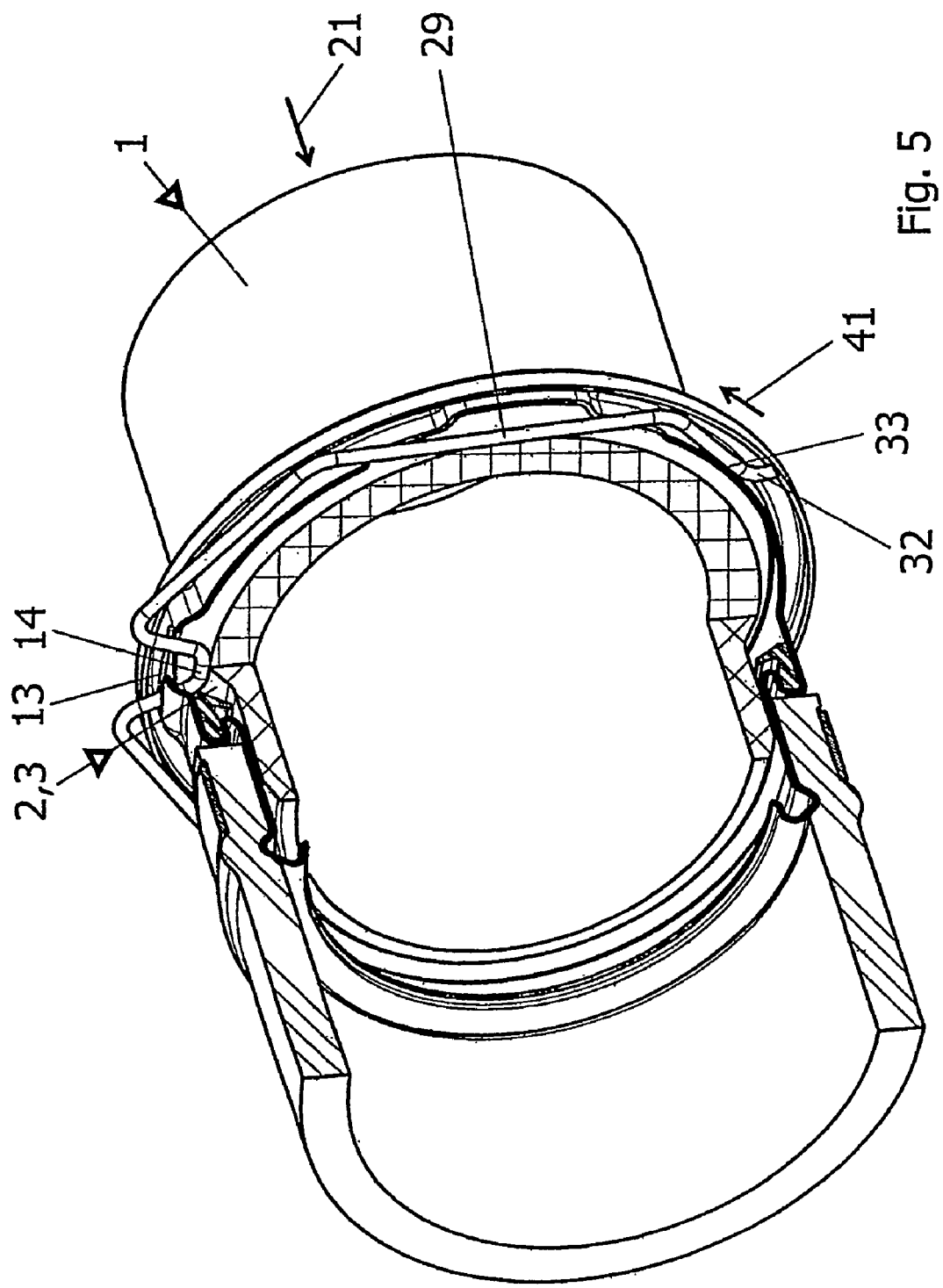
Figure 9:
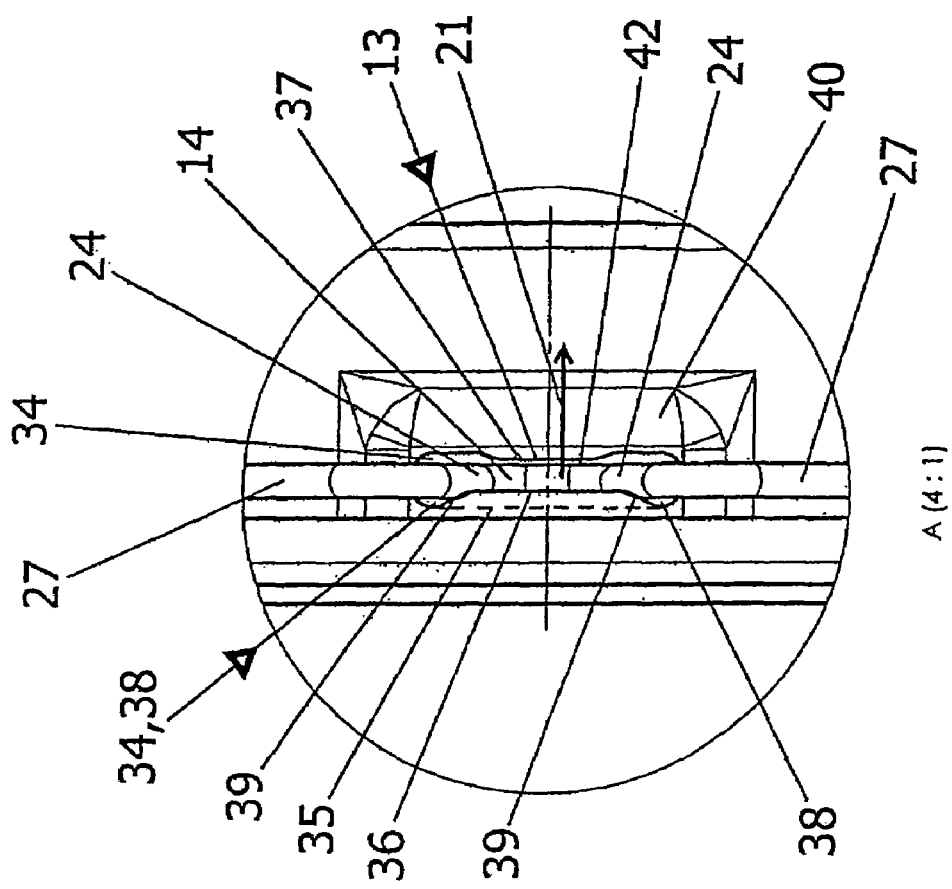
Figure 8:
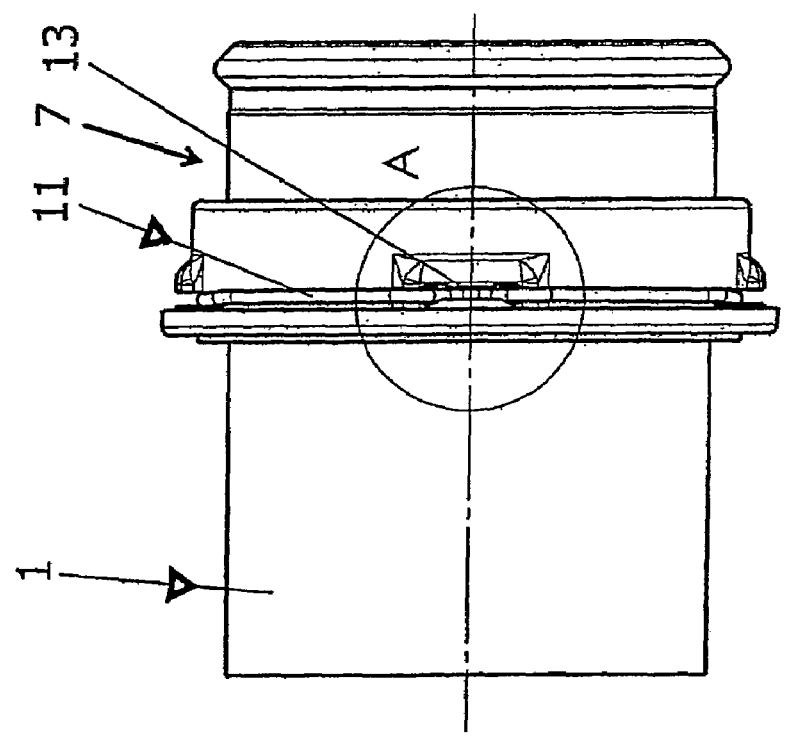
Figures 11, 12:
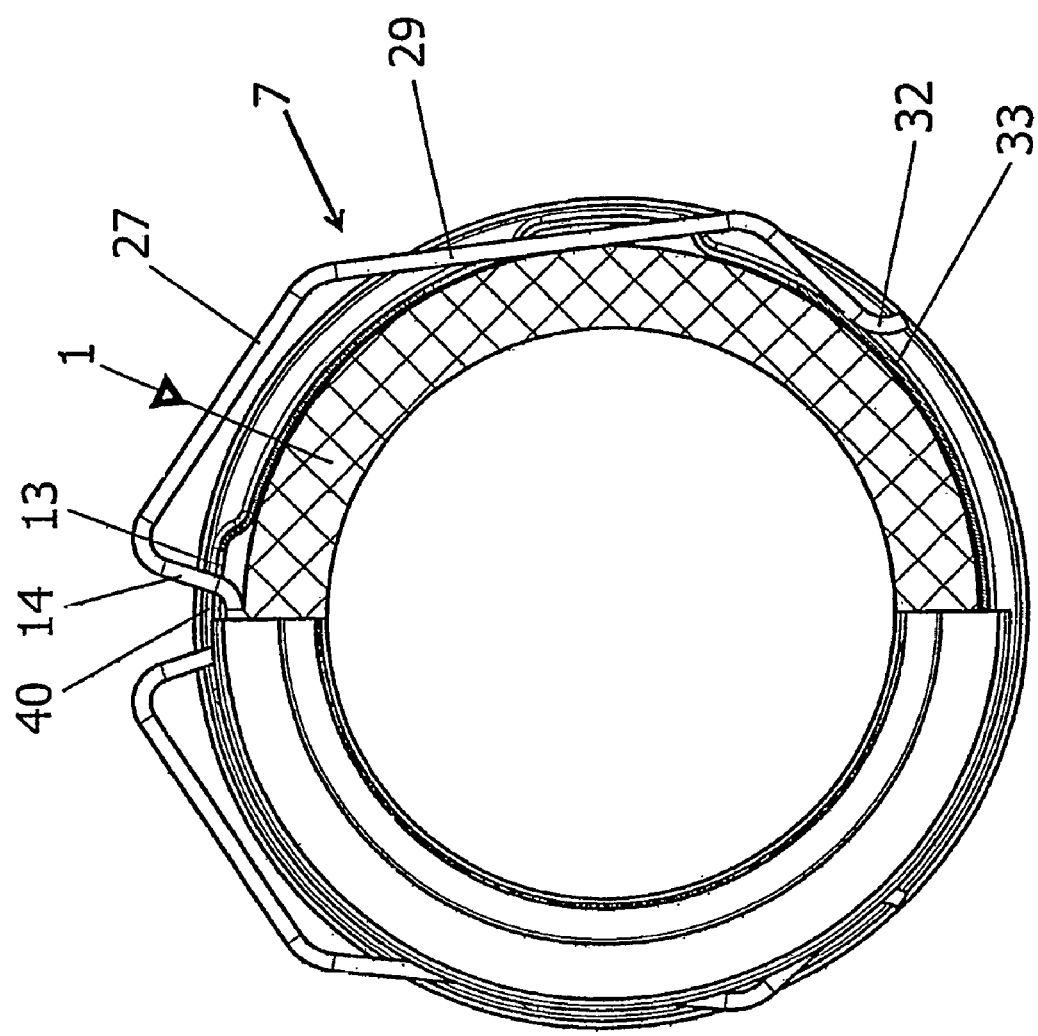
Figure 18:
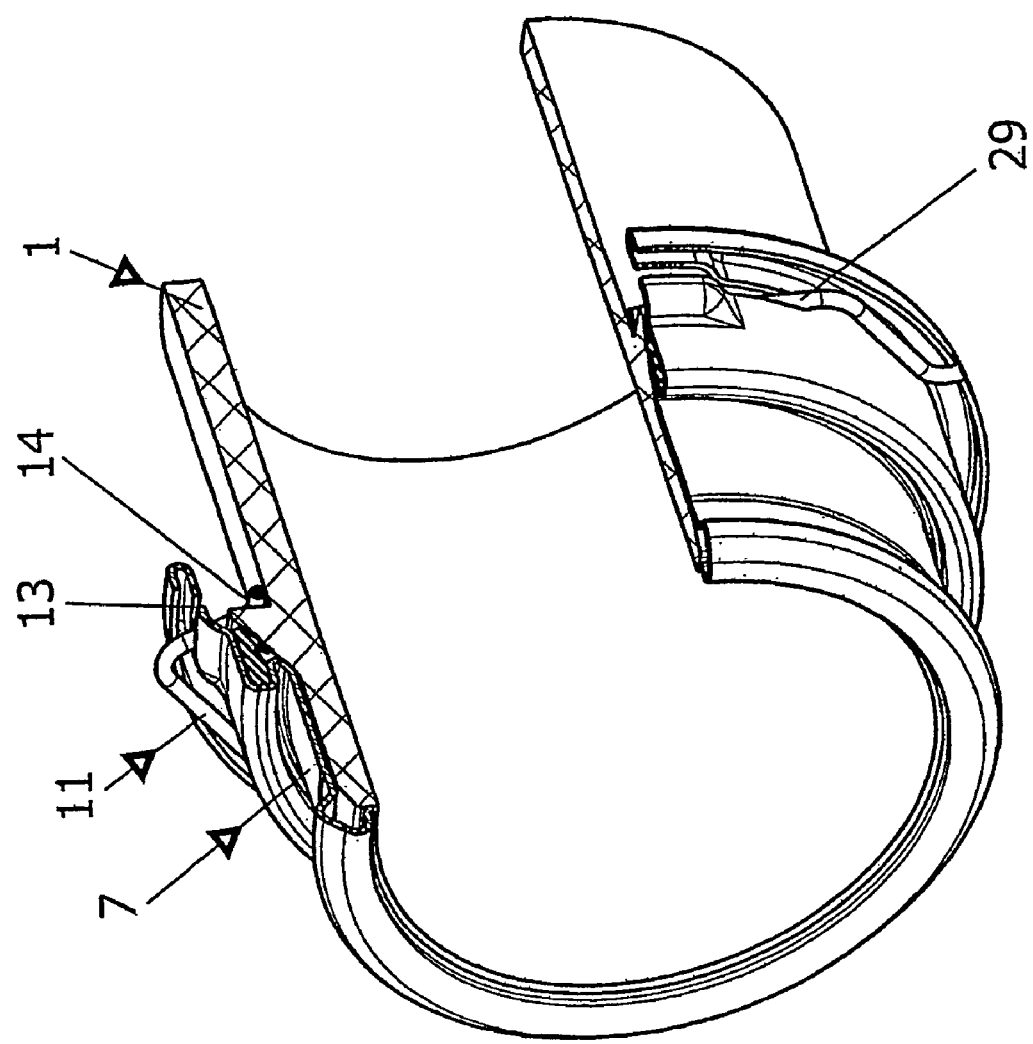
Figure 19:
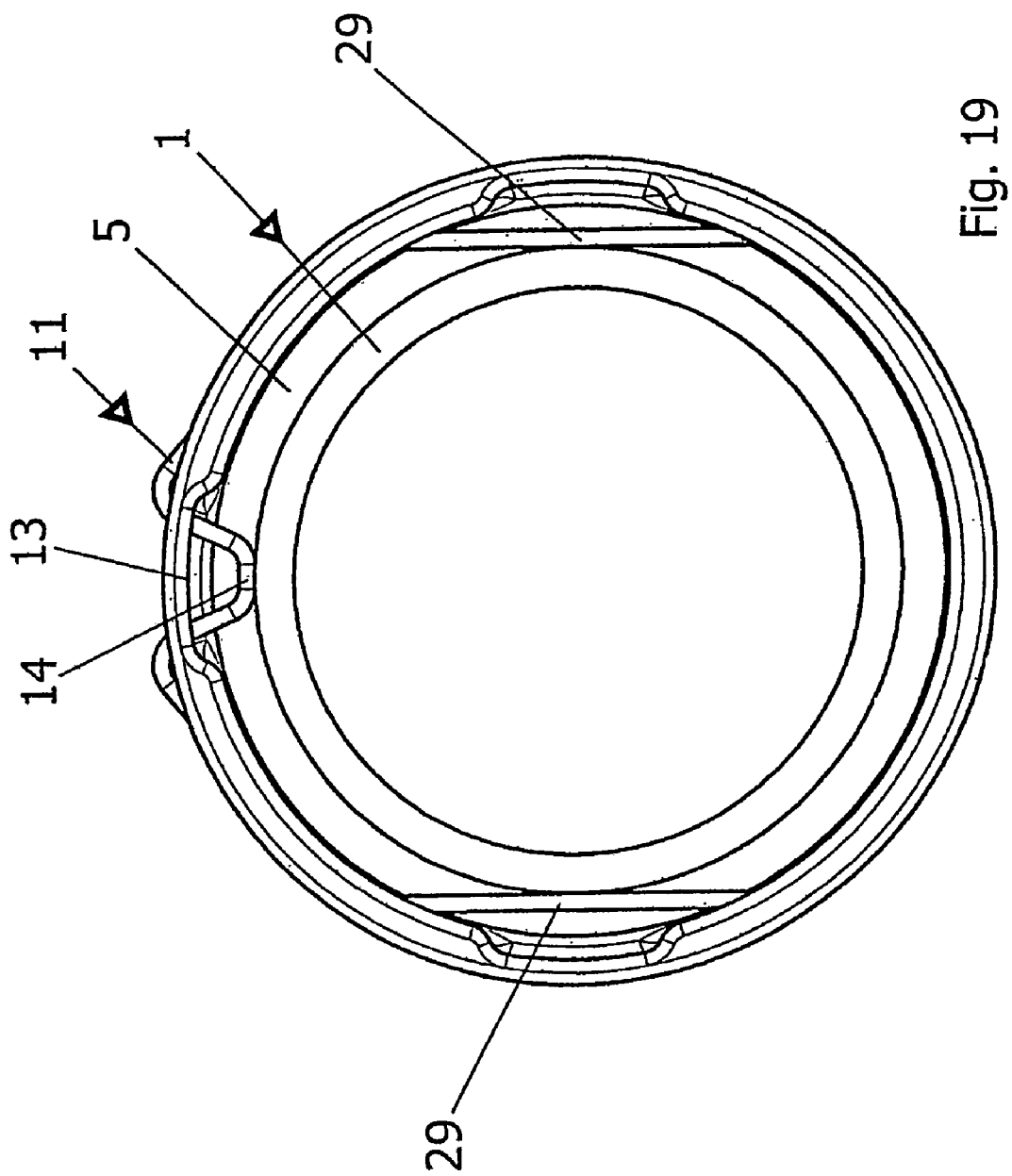
FIG. 19 shows the completely latched position according to the section of FIG. 18.

In the modified embodiment, the catch legs 29 are not implemented as straight segments, but the catch legs 29' instead are bent inwardly. The catch spring openings 15', 16' can then be shortened.

The bend on catch leg 29' is implemented essentially as a connecting leg 47 which is bent radially inward and transitions into a base leg 46. The base leg 46 is connected with the outer spring end 32 via a connecting leg 47.

According to another embodiment, only the upper connecting leg 47 may be bent radially inward at an angle, whereas the lower connecting leg 47 is parallel to and aligned along the same axis as the base leg 47.

An inverse configuration is also possible, wherein the upper connecting leg 47 is straight and parallel to the base leg 46, whereas the lower connecting leg 47 is bent accordingly.

FIG. 20 also shows that the spring end 32 may be eliminated entirely. The spring ends 32 allows the catch spring (in the region of the spring end 32) to slide outward in the radial direction when the catch spring is lifted.

This displacement function of the spring end on the wall 33 of plug 7 can also be eliminated if the inwardly angled connecting leg 47 is allowed to slide on the wall of the catch spring opening 15', 16'. Accordingly, the movement of the catch spring can be guided in a different manner.

FIGS. 21 to 24 show another embodiment wherein the control slit 13 and slot 34 can be entirely eliminated, and the control clip 14' on the catch spring 11' can instead be bent from the start in the insertion direction, as shown in FIGS. 22 to 24. The pivot motion 44 can then also be eliminated because the control clip 14' is always bent forward in the insertion direction, thereby forming a snap-in location which is offset forward in the axial direction in relation to the two other snap-in locations on the catch legs 29.

The aforementioned pivoting motion 44 is also evidenced by an offset 43, as seen in FIGS. 13 and 14, which occurs when the control clip 14 is almost completely lifted out of the control slit 13. It is evident that the catch legs 29 maintain their straight orientation, whereas the spring legs 27 arranged subsequently in the center region perform a forward pivot motion 44 in the insertion direction. This causes the offset 43 shown in FIG. 13 between the center region of the catch spring, namely in the control clip 14 and the catch legs 29.

This is also indicated by the slope 45 in FIG. 15.

FIG. 14 also shows that the two opposing constrictions 36, 37 in slot 34 form a narrow region which prevents the control clip 14 from sliding out of the control slit 13. The control clip 14 is therefore held captive.

Figure 25:
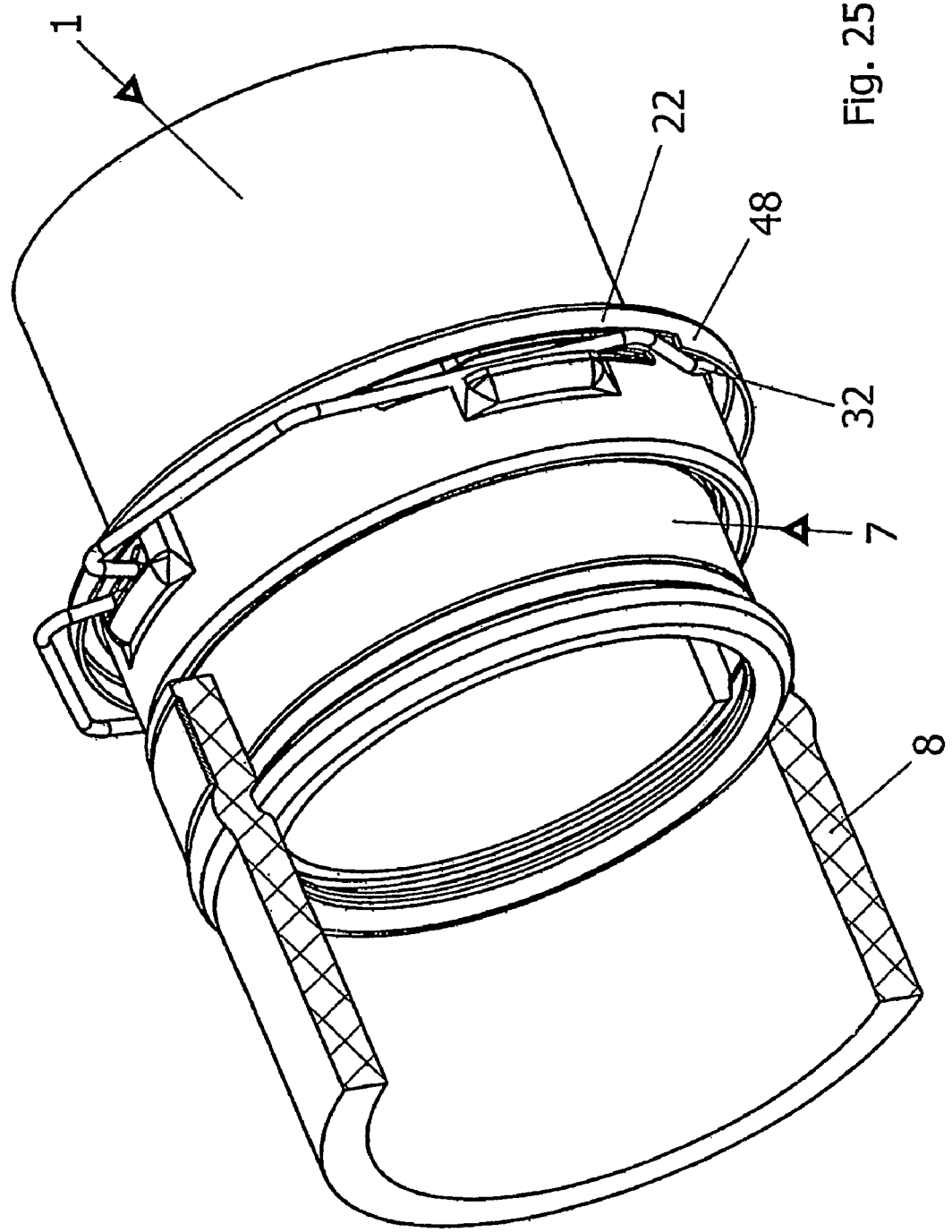
Figure 26:
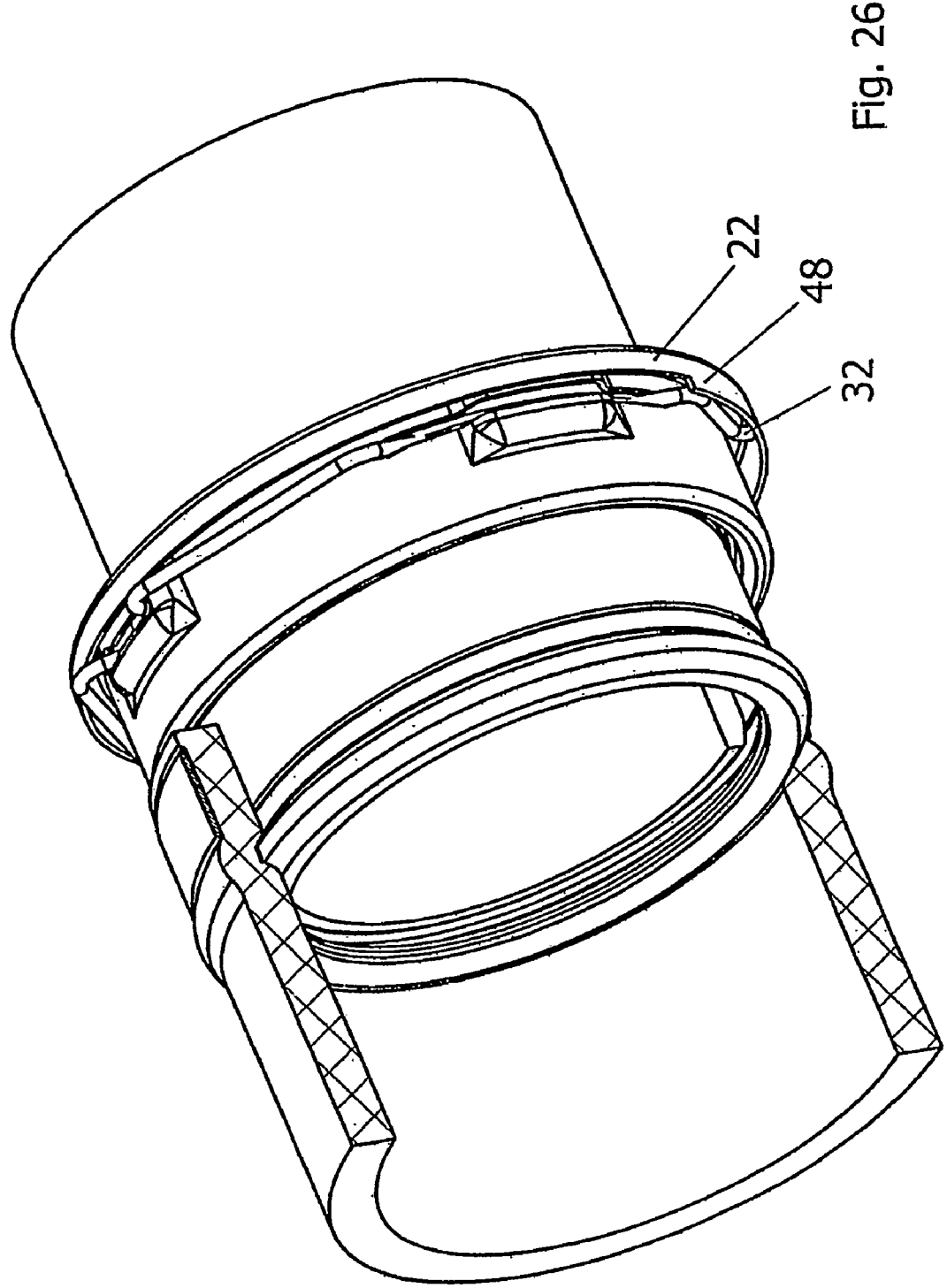

FIGS. 25 and 26 show another exemplary embodiment where the reinforcing edge 22 of plug 7 can also have a protective edge 48 in the region of the spring ends 32 which is lengthened in the axial direction and covers the spring ends. The protective edge 48 prevents the spring ends 32 from being unintentionally lifted out of the plug section 10.

The invention claimed is:

1. A plug-in connection for tube and hose lines comprising a nozzle having an inserting end and a radially outward projecting inclined shoulder extending at least partially around the outer circumference of the nozzle, the shoulder forming a latching surface on a side facing away from the insertion end, and a plug receiving the nozzle, the plug including an approximately U-shaped catch spring having an approximately centered section and two lateral legs adapted to latch on the latching surface of the nozzle shoulder when the nozzle is inserted in the plug, wherein the approximately centered section of the catch spring is located rearward in relation to the two lateral legs when viewed toward the nozzle, causing the approximately centered section of the catch spring to move across the inclined shoulder when the nozzle is inserted in the plug, and to urge the legs of the catch spring radially outwardly, and wherein the catch spring is movable into a lowered position to cause the legs of the catch spring to latch synchronously and concurrently in the region of the latching surface on the shoulder.

2. The plug-in connection of claim 1, wherein upon insertion of the nozzle in the plug, the approximately centered section of the catch spring latches first with the latching surface on the nozzle, causing a radially inward motion of the catch spring on the plug and the two lateral legs of the catch spring to latch on the latching surface of the nozzle with an axial offset.

3. The plug-in connection of claim 1, wherein an additional approximately centered section of the catch spring is formed as a radially inwardly facing control clip.

4. Plug-in connection of claim 3, wherein the plug comprises a slot forming a control slit with inclined surfaces, and wherein the control clip is bent away from the catch spring in an approximately trapezoidal shape to form inclined legs, with the inclined legs of the control clip sliding on the inclined surfaces of the control slit during latching and producing an offset in a direction facing away from the nozzle.

* * * * *